Aug. 16, 1966 S. F. FINKEY ETAL 3,267,388

AUTOMATIC THRESHOLD AMPLIFIER EMPLOYING VARIABLE IMPEDANCE MEANS

Filed April 26, 1963

INVENTORS
STEPHEN F. FINKEY
ROBERT M. SMITH
ABRAHAM BROTHMAN

By OSTROLENK, FABER, GERB & SOFFEN
ATTORNEYS

United States Patent Office 3,267,388
Patented August 16, 1966

3,267,388
AUTOMATIC THRESHOLD AMPLIFIER EMPLOYING VARIABLE IMPEDANCE MEANS

Stephen F. Finkey, Passaic, Robert M. Smith, Lodi, and Abraham Brothman, Dumont, N.J., assignors to Transitel International Corporation, Paramus, N.J., a corporation of New Jersey Filed Apr. 26, 1963, Ser. No. 275,937
3 Claims. (Cl. 330—18)

This invention relates to an amplifying means and more particularly to amplification means employing novel control means enabling the amplifier to yield an output waveshape which is identical to the input waveshape, but which has an amplified output which remains constant within certain bounds.

Data communication occurs in a variety of different forms. Some typical communication systems are radio, telephone, telegraph and ultra high frequency, to name just a few. All of these communication systems, however, have one basic factor in common, that being the attenuation or distortion of transmitted data due to noise phenomenon which is injected into the communications link. The noise phenomenon may assume a variety of different forms such as impulse noise, drop-out noise, fading, white noise, and so forth. Detailed definitions of these different types of noise phenomenon are set forth in greater detail in copending U.S. applications Serial No. 231,078 filed October 17, 1962 by Abraham Brothman et al., and Serial No. 241,917 filed December 3, 1962 by Abraham Brothman et al.

One of the most prevalent types of noise phenomenon affecting communication links is that of fading. This noise phenomenon consists of a gradual, as opposed to rapid, drifting of the signal amplitude sent from transmitter to receiver. Fading may result from temperature changes, various weather conditions such as rain, sleet, snow, humidity changes, and so forth. In cases where a communications link is initially established, it becomes necessary to adjust the transceiving equipment at both remote locations in order to assure the receipt of data at a suitable signal-to-noise ratio to insure the accuracy and reliability of such received data. After such initial adjustments, the attenuation imposed upon data transmitted by the communications link may drift, due to the ambient conditions, such as, for example, those recited immediately above. While such drift may not be rapid, nevertheless over longer periods of time, the signal level of transmitted data may be significantly affected so as to render any subsequent data useless as to its accuracy and reliability. Thus, in order to insure continuous receipt of accurate and reliable data, it, therefore, becomes necessary to continuously adjust transceiving equipment at both remote locations in order to insure the transmission and receipt of correct data.

Another situation encountered in communications links is the alteration of the link utilized between the remote location transceiving equipment. For example, in telephony systems two remote locations may be connected through a switchboard located at a central exchange location. It is quite possible, however, due to the high priority value of such a line, or for any other purpose for that matter, that this link must be terminated in favor of a different link which again will establish contact between the two remote locations. This second link may pass through two telephone central exchanges, and being a significantly longer communications link, it necessarily alters the attenuation characteristics of the communications link, thereby requiring still another adjustment of the transceiver equipment at the remote locations in order to maintain a high level of reliable data transmission between the remote locations.

Therefore, in view of the many conditions which may be imposed upon a communications link to cause its attenuation characteristics to be forever changing, it becomes quite valuable to provide automatic means for adjusting, without the need for manual initiation, the communications link so as to maintain at all times a communications link having a high level of reliability.

Since it is difficult at the transmission location to determine what type of attenuation data being transmitted will undergo, such automatic adjustment means are normally provided at the receiver location so as to amplify the received signals to levels suitable for processing at the receiver location.

Some of the previous methods which have been employed in order to provide such automatic adjustment means are:

(a) Using amplification means having forward AGC (automatic gain control). This arrangement has a frequency limitation in that the frequency of operation is near the cut-off frequency of the transistor-amplifiers employed. Also amplification means of this type operate successfully only upon sinusoidal waveshapes at specific frequencies, and are, therefore, unsuccessful in operating upon data received in the form of square pulses or ramps (i.e. sawtooths).

(b) Amplifier means having backward AGC. These circuits suffer from a great deal of distortion of waveshape due to the non-linear feedback (diode, etc.) arrangement.

(c) A controlled amplification stage with the input used as the control voltage. Such circuits suffer from a lack of stability and poor reproducibility.

(d) Circuits employing the lead resistance of a diode with a resistance change occurring by means of the input signal strength rectified and put through the diode. The disadvantages here are that the circuit has only fair stability and poor reproducibility, and that the resistance of the diode changes with time and replacement. The other disadvantage is its relatively small range of operation [10 db] and high distortion characteristics.

(e) The employment of the amplification means having a tetrode transistor with the control voltage being used to vary the control base bias, and thus the gain of the transistor. The main disadvantage here is a very small range and relative expense of components employed.

The basic concept of the instant invention is the utilization of the output signal of the automatic threshold amplifier in a feedback loop to control an amplifier stage transistor in order to vary the amplification of the amplifier stage including such transistor. The arrangement provides excellent operation characteristics over a range which experimentally has been found to extend from below −40 dbm to −4 dbm.

The instant invention is comprised of input means for receiving and impressing input signals upon an amplifier stage having a variable impedance element which controls the amplification of the first amplifier stage. The output of this stage is impressed upon a high gain amplifier which provides the output signal of the automatic threshold amplifier circuit. A control circuit is provided which receives a portion of the output signal and passes only negative peaks of the output signal, which negative peaks are suitably filtered by distributed filtering means and are impressed upon a D.-C. amplifying means. The output of the D.-C. amplifying means is then impressed upon the control terminal of the variable impedance means so as to vary the impedance value of the first amplifier stage in order to control its amplification.

The distributed filter means are designed so as to collectively provide minimization of response time while at the same time providing adequate ripple removal of signals imposed thereon. Use of the distributed filter means have further been found to greatly enhance the discharge rate over a single lump filter arrangement which not only requires more time for discharge thereof, but additionally requires larger, more expensive components. Experimentation has shown that with input signals varying in the range from 6/10 of a millivolt to 100 millivolts, the output voltage varies within the range of 0.35 to 1.59 volts, which is an extremely suitable control range, thereby greatly facilitating processing of received information signals. It has been found that these control ranges have been identical, regardless of the operating frequencies within the range from 60 c.p.s. to 150 kc. where this frequency range was limited only by the cut-off frequency of transistors employed and the interconnection capacitances of the circuit establishing the upper and lower frequency limits respectively.

It is, therefore, one object of the instant invention to provide an automatic threshold amplifier means yielding an output waveshape which is substantially identical to the input waveshape when the time duration of the input pulses are equal to or less than the time constant of the input circuit wherein the amplified output remains constant within certain bounds, while the input amplitude may vary over an extremely wide range.

Another object of the instant invention is to provide automatic threshold amplification means employing novel control means which utilizes the output of the automatic threshold amplifier in a feedback loop to control amplifier stage variable impedance means to vary the amplification of the stage.

Another object of the instant invention is to provide an automatic threshold amplifier to provide an amplified output which is constant within certain bounds and which is substantially identical in waveshape to the input waveshape when the time duration of the input pulses are equal to or less than the time constant of the input circuit wherein said amplifier means employ novel filtering means to minimize the amplifier response time, as well as minimizing the discharge time of the filter means.

Still another object of the instant invention is to provide an automatic threshold amplifier means for providing an output waveshape substantially identical to the input waveshape when the time duration of the input pulses are equal to or less than the time constant of the input circuit wherein the amplified output remains constant within certain bounds, which amplifier means comprises novel control means and a plurality of amplification stages controlled by said control means in order to obtain any desired gain.

These and other objects of the instant invention will become apparent when reading the accompanying description and drawings, in which.

Figure 1:
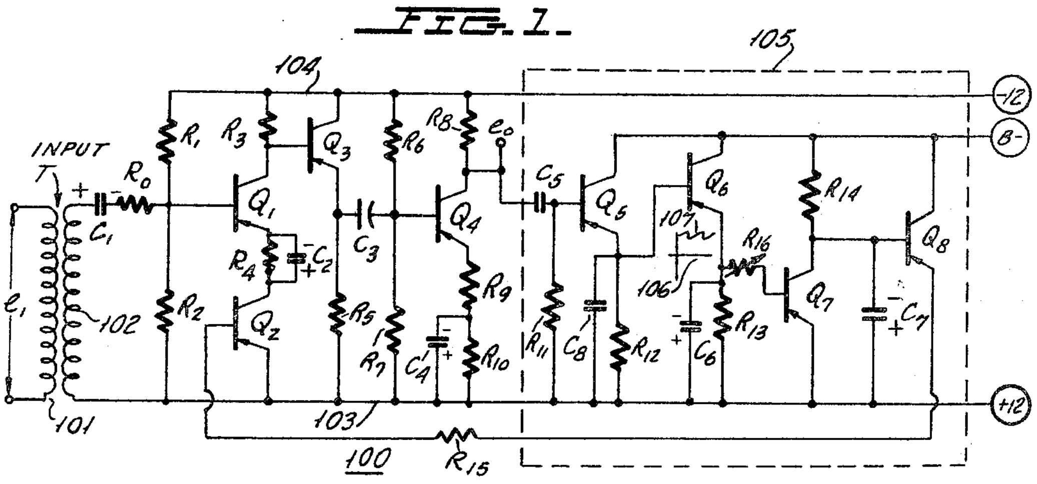
FIGURE 1 is a schematic diagram of an automatic amplifier designed in accordance with the principles of the instant invention.
Figure 3A:
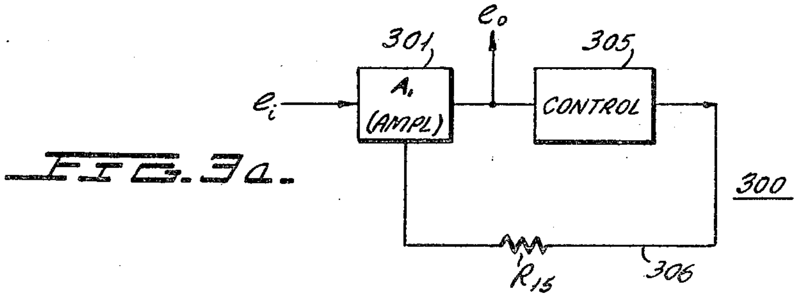

FIGURE 3*a* is a block diagram of the automatic threshold amplifying means of FIGURE 1.

Figure 3B:
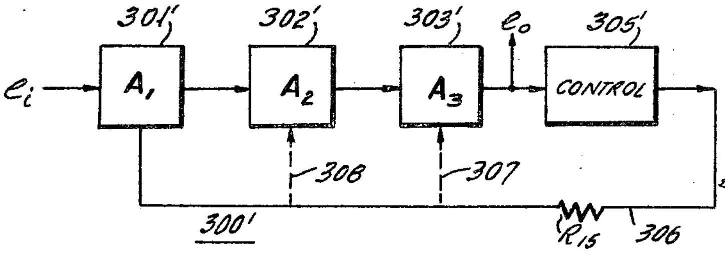

FIGURE 3*b* is an alternative embodiment in block diagram form of the amplifying means of FIGURES 1 and 3*a*.

Referring now to FIGURE 1, the figure shows an automatic threshold amplifier 100 comprised of an input transformer T having an input winding 101 adapted for receiving the input signal $e_i$. The output winding 102, which is inductively coupled to winding 101, has its output terminals connected between a +12 v. D.C. bus 103 and the series connected capacitor and resistor $C_1$, $R_9$, respectively, which is connected in turn to the base electrode of a transistor $Q_1$. The emitter electrode of transistor $Q_1$ is connected in series with the parallel resistor-capacitor elements $R_4$, $C_2$, the opposite terminals of which are connected to the collector electrode of a transistor $Q_2$. In the frequency range for this invention the value of $C_2$ must be of sufficient magnitude to completely A.C. bypass the emitter-resistor $R_4$ for the frequency of the device, thus leaving only the effective emitter-collector resistance of $Q_2$ in the emitter circuit of $Q_1$. The series connected transistors $Q_1$ and $Q_2$ are connected across the +12 v. D.C. bus 103 and −12 v. D.C. bus 104 via resistor $R_3$.

The heart of the automatic threshold amplifier 100 lies in the first amplifier arrangement comprised of transistor $Q_1$ which, along with transistor $Q_2$ and emitter follower transistor $Q_3$, establishes the amplification of the first amplifier stage. Voltage amplification $A_V$ for transistor $Q_1$ is $$A_V = R_3 / R_{Q_2}$$

Where $R_{Q_2}$ is the effective A.-C. resistance between the collector and emitter electrodes of transistor $Q_2$.

The transistor $Q_2$ is in saturation in the range of interest of the input signal $e_i$ so that the transistor $Q_2$ may be looked upon as a diode whose resistance varies with the magnitude of current impressed upon its base electrode. If the magnitude of current is large, $R_{Q_2}$ is small, and vice versa. This control voltage is obtained from a smooth version of the output signal from the transistor $Q_4$ in a manner to be more fully described.

The output of the first amplifier stage is taken from the collector electrode of transistor $Q_1$ and impressed upon the base electrode of a transistor $Q_3$ which is employed in an emitter follower arrangement so as to prevent loading of the amplifier $Q_1$ and its load resistor $R_3$. The output from transistor $Q_3$ is taken from its emitter electrode which is connected to the base electrode of transistor $Q_4$ through series connected capacitor $C_3$ which is the coupling capacitor between the emitter follower and the second amplification stage. The value of capacitor $C_3$ is taken to be sufficiently large to pass all frequencies of interest. For example, when using 2500 cycles per second as the carrier frequency, the capacitance value for $C_3$ is chosen as 0.03 $\mu$f. so as to attenuate the 60 cycle pick-up from the power supplies and leads employed in the automatic threshold amplifier circuit. The resistor-capacitor elements $R_8$, $R_{10}$ and $C_4$, as well as transistor $Q_4$ are selected so as to provide a gain of approximately 10. The output of the automatic threshold amplifier $e_0$ is taken from the collector electrode of transistor $Q_4$, which output signal may be employed to operate telegraphy, telephony or other suitable utilization means.

The control means 105 for the automatic threshold amplifier 100 accepts a portion of the output signal $e_0$ and is comprised of a first transistor $Q_5$ which is series connected with the collector electrode of transistor $Q_4$ by means of capacitance $C_5$. The transistor $Q_5$ is employed in an emitter follower arrangement and is polarized in such a manner as to pass only negative peaks therethrough. Since it is an emitter follower arrangement, it prevents loading of the transistor $Q_4$ during the occurrence of such negative peaks. The output from transistor $Q_5$ is taken at its emitter electrode which is connected to the base electrode of the transistor $Q_6$. Also connected to the emitter electrode of transistor $Q_5$ is a filter network comprised of resistor $R_{12}$ and capacitor $C_8$ which is employed to filter or smooth the output taken from transistor $Q_5$. This smoothed output is impressed upon transistor $Q_6$ which is also connected in emitter follower fashion, and is likewise polarized so as to pass negative peaks therethrough. The output of transistor $Q_6$ is taken from its emitter electrode which is connected through a resistance element $R_{16}$ to the base electrode of transistor $Q_7$. A second filter network comprised of resistor $R_{13}$ and capacitor $C_6$ is connected to the emitter electrode of transistor $Q_6$ in order to further filter or smooth the output of transistor $Q_6$. The emitter waveform obtained from the output of transistor $Q_6$ is substantially a sawtooth wavefrom riding on a D.-C. output, as shown by waveform 107 of plot 106 positioned adjacent the emitter electrode. The resistor $R_{16}$ is adjusted to control the current which flows into the base of the D.-C. amplifying means which is the transistor $Q_7$. Transistor $Q_7$ is a stable transistor which is chosen so as to experience very little change in $h_{fe}$, the characteristic known as the D.-C. current gain parameter of the transistor. It has been found that through actual experimentation the resistance $R_{16}$ should be adjusted so that transistor $Q_7$ gives an output at its collector electrode of 1.27 v. R.M.S. at the output terminal $e_0$ for a 0.01 v. R.M.S. input plus or minus 10%.

The output of transistor $Q_7$ is taken from its collector electrode which feeds the base electrode of transistor $Q_8$. Transistor $Q_8$ has its emitter electrode connected through series resistor $R_{15}$ to the base electrode of transistor $Q_2$. Resistor $R_{15}$ determines the magnitude of current which is impressed upon the control transistor $Q_2$. Resistance means $R_{16}$ has been made adjustable so as to facilitate the replacement of transistor $Q_7$ when necessary. Transistor $Q_7$, however, should not need replacement, as it is considerably underrated in the circuit design set forth herein.

The circuit 100 of the instant invention provides negative feedback sufficient to overcome variations in control transistor parameters. The circuit described herein has a response time of approximately 0.5 second from zero input to maximum input $e_i$. The individual filter networks $C_8$–$R_{12}$, $C_6$–$R_{13}$, and $C_7$ have been chosen so as to minimize response time while, at the same time, providing adequate ripple removal of the negative peaks passed by the control circuit 105. It has been found that if an attempt is made to eliminate one or more of these control networks and, in order to compensate for this, if the value of capacitance $C_7$ is lowered significantly, it has been found that the circuit will provide faulty operation in that it will oscillate at a much lower frequency than the circuit 100.

In actual tests with the phase shift tone receiver, which is a specific type of receiver described in copending U.S. application Serial No. 301,110, filed August 9, 1963 by A. Brothman et al., and assigned to the assignee of the instant invention, it was found that detection by use of the automatic threshold amplifying means 100 was excellent from −4 dbm to −40 dbm. Below −40 dbm detection is not desired as the ambient noise on the link becomes significant in comparison to the signal. Positive and negative peak limiting of the device made detection of levels above −4 dbm unreliable. The first indication of unreliable detection are "split bits" which are defined as binary bits which are split at some position of their bit interval, the split position being in the opposite state from that of the remainder of the bit. In actual tests, the system employed a telephone link as its communications link, and this required the presence of resistor $R_0$ which is found to greatly enhance the operation of the circuit 100. While actual tests employed the instant invention, in combination with a phase shift tone receiver, it should be clearly understood that the automatic threshold amplifier of the instant invention may be adapted for use with any other forms of transmission and receiving equipment, and the type of system employed therewith lends no novelty to the instant invention.

The following test data clearly shows the manner in which the output signal $e_0$ was contained within extremely narrow limits, while the input signal $e_i$ was varied over a 50 db range.

*Input-output and control reading No. 1 for ATA*

| $e_{input}$ (R.M.S.) | $e_i$ (peak) | $e_{out}$ (p-p) | $e_o$ (R.M.S.) | $e_{control}$ (D.C. v.) | Distortion (percent) |
|---|---|---|---|---|---|
| 0 | 0 | 0.0 | 0 | −6.7 | 0 |
| .0006 | 0.00085 | 0.5 | 0.354 | −6.0 | 0 |
| .001 | 0.00141 | 1.0 | 0.707 | −4.0 | 0 |
| .002 | 0.00282 | 1.5 | 1.06 | −2.4 | 0 |
| .003 | 0.00423 | 1.6 | 1.13 | −1.9 | 0 |
| .006 | 0.0085 | 1.8 | 1.27 | −1.46 | 0 |
| .01 | 0.01414 | 1.8 | 1.27 | −1.25 | 0 |
| .02 | 0.0282 | 1.85 | 1.31 | −1.07 | 0 |
| .04 | 0.0564 | 2.0 | 1.41 | −0.93 | 0 |
| .04 | 0.0707 | 2.0 | 1.55 | −0.90 | 0 |
| .06 | 0.085 | 2.2 | 1.59 | −0.89 | 0 |
| .07 | 0.099 | 2.2 | 1.59 | −0.87 | 0 |
| .08 | 0.113 | 2.2 | 1.59 | −0.86 | 1 |
| .09 | 0.128 | 2.2 | 1.59 | −0.82 | 2 |
| .10 | 0.141 | 2.2 | 1.59 | −0.81 | 2-3 |

Larger inputs are obtainable at greater distortion.

The input will be divided down about 10 times so .001 corresponds to −40 db, .035 to −10 db. Readings are the same for frequencies between 60 c.p.s. and 150 kc. The upper frequency limitation is the transistor cut-off frequency, the lower one is due to interconnection capacitance.

Ranges shown here correspond to greater than 50 db within a one volt peak to peak variation; i.e., from 2.2 to 1.1 volts peak-to-peak.

Figure 2:
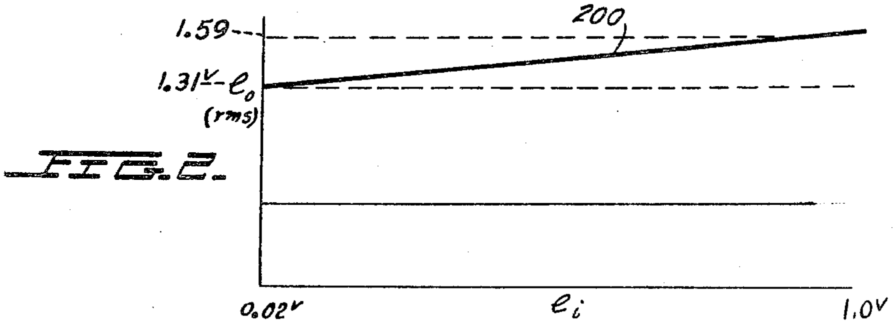
FIGURE 2 is a curve showing the relationship between input signal and output signal as derived from the amplifying means of FIGURE 1.

The test data can also be seen graphically by means of FIGURE 2 which shows that for input $e_i$, which may vary over an extremely wide range, the output signal $e_0$ (see curve 200 of FIGURE 2) obtained varies over extremely narrow limits.

Turning to FIGURES 3*a* and 3*b*, FIGURE 3*a* shows a diagrammatic representation of the automatic threshold amplifier 100 of FIGURE 1 wherein the embodiment 300 of FIGURE 3*a* is comprised of amplifier means 301 for receiving input signal $e_i$ amplifying it to provide the output signal $e_0$, and further is provided with the control means 305 having a feedback path 306 for controlling the gain of amplifier 301.

As an alternative to the above embodiment of FIGURE 3*a*, the embodiment 300′ of FIGURE 3*b* may be employed, which is comprised of a plurality of amplifier stages 301′ through 303′ wherein the input $e_i$ is impressed upon the input terminal of stage 301′, and the output signal $e_0$ is taken from the output stage of amplifier stage 303′. The portion of the output signal $e_0$ is employed by the control means 305′ through the feedback loop 306′ to control the amplification in stage 301′. If it is further desired, the control means 305′ may impress this feedback signal upon the control inputs of all three stages 301′ through 303′, as shown by the additional dotted connections 308 and 307 respectively. The arrangement of FIGURE 3*b* has the advantage over the arrangement of FIGURE 3*a* in that it provides greater gain capabilities while using only one control block 305′. By controlling the gain of all three amplifier stages 301′ through 303′, this gives still greater control over the gain of the entire circuit 300′. Also, the employment of a plurality of amplifier stages, each having independent filter stage, further permits minimization of the response time of the circuit as well as discharge time of the individual capacitive elements used in each filter stage.

The instant invention has been found to provide the advantages of extremely low distortion; wide range frequency response; stability of operation, both in total operation time, as well as parts replacement due to the feedback introduced; the ability to handle waveshapes other than sinusoidal waveshapes (i.e., sawtooth, square waves, etc.); ability to extend the range by the addition of many amplification stages while using only a single feedback stage; the ability to tolerate power supply variations of greater than 10% with no noticeable change in the output $e_0$ of the amplifier means; and the ability to operate over an extremely wide signal amplitude range (50 db) which is a greater range than any devices previously employed.

Although this invention has been described with respect to its preferred embodiments, it should be understood that many variations and modifications will now be obvious to those skilled in the art, and it is preferred, therefore, that the scope of this invention be limited not by the specific disclosure herein but only by the appended claims.

The embodiments of the invention in which an exclusive privilege or property is claimed are defined as follows:

1. Means for amplifying signals within predetermined limits comprising variable gain amplifying means for receiving and amplifying said signals; control means connected to said variable gain amplifying means energizable by only a portion of the output signal of said variable gain amplifying means; said variable gain amplifying means comprising gain control means connected to the output of said control means for automatically adjusting the gain of said variable gain amplifying means, said control means comprising plural emitter follower means connected in cascade fashion, each of said emitter follower means further comprising filter means coupled to the emitter of their associated emitter follower means for smoothing the output of said control means; said first and second filter means being employed to minimize both the response time of said amplifying means and the amount of ripple present in the outpost signal of said control means; substantially constant amplifying means connected to the output of said variable gain amplifying means for increasing the overall gain of said amplifying means; said variable gain amplifying means comprising third and fourth transistor means having base, emitter and collector electrodes and being connected in series fashion; said third transistor means having electrode means for receiving said signals to be amplified, said fourth transistor means having electrode means connected to the output of said control means; the operating range of said fourth transistor means always being in saturation; a bypass capacitor being connected in parallel with a resistor; the parallel connected resistor and bypass capacitor being connected between the emitter of said third transistor and the collector of the fourth transistor.

2. A circuit for maintaining the amplitude of an incoming signal within a limited range wherein said incoming signal may vary over a wide range of both frequencies and amplitude comprising:

a first transistor having emitter, collector and base electrodes, the base electrode being coupled to receive the incoming signal;

a second transistor having emitter, collector and base electrodes;

a bypass capacitor; a resistor connected in parallel with said bypass capacitor; said parallel connected resistor and bypass capacitor being connected between the emitter of said first transistor and the collector of said second transistor;

a constant gain transistor stage coupled to the first transistor collector;

the output of said constant gain transistor stage being coupled to a first emitter follower circuit including first filter means coupled to the emitter of said emitter follower circuit;

a second emitter follower circuit coupled in cascade fashion with said first emitter follower circuit and having second filter means being coupled to the emitter of said second emitter follower circuit;

a third transistor having emitter, collector and base electrodes, the base of said third transistor being coupled to the output of said second emitter follower circuit; second resistor means coupling the emitter of said third transistor to the base of said second transistor for controlling the impedance of said second transistor;

at least one of said emitter follower circuits including bias means for passing only negative signals through its associated emitter follower circuit.

3. Means for amplifying signals within predetermined limits comprising:

variable gain amplifying means for receiving and amplifying said signals;

control means connected to said variable gain amplifying means energizable by only a portion of the output signal of said variable gain amplifying means;

said variable gain amplifying means comprising gain control means connected to the output of said control means for automatically adjusting the gain of said variable gain amplifying means;

said variable gain amplifying means being comprised of first and second transistor means connected in series fashion;

said first transistor means having a base electrode for receiving signals to be amplified;

said second transistor means having a base electrode connected to the output of said control means;

the operating range of said second transistor means always being in saturation;

a bypass capacitor being connected in parallel with a resistor;

said first and second transistor means further including emitter and collector electrodes, respectively;

the parallel connected resistor and bypass capacitor being connected between the emitter of said first transistor means and the collector of the second transistor means.

References Cited by the Examiner

UNITED STATES PATENTS

| | | | |
|---|---|---|---|
| 2,288,434 | 6/1942 | Bradley | 330—141 X |
| 2,773,945 | 12/1956 | Theriault | 330—29 X |
| 3,019,396 | 1/1962 | Heine et al. | 330—29 X |
| 3,075,151 | 1/1963 | Murray | 330—20 |
| 3,109,989 | 11/1963 | Muir | 330—141 X |
| 3,117,287 | 1/1964 | Damico | 330—29 X |

ROY LAKE, *Primary Examiner.*

F. D. PARIS, R. P. KANANEN, *Assistant Examiners.*